United States Patent [19]

Hartmann

[11] Patent Number: 4,506,864
[45] Date of Patent: Mar. 26, 1985

[54] VALVE SEAL ASSEMBLY

[76] Inventor: Werner Hartmann, Am Hütteberg 8, D-3167 Burgdorf-Ehlershausen, Fed. Rep. of Germany

[21] Appl. No.: 621,025

[22] Filed: Jun. 13, 1984

[30] Foreign Application Priority Data

Jun. 16, 1983 [DE] Fed. Rep. of Germany ....... 3321819

[51] Int. Cl.³ ............................................. F16K 25/00
[52] U.S. Cl. ..................................... 251/174; 251/363; 277/129
[58] Field of Search ............... 251/161, 159, 174, 363; 277/129, 126

[56] References Cited

U.S. PATENT DOCUMENTS

| 2,324,225 | 7/1943 | Mueller | 277/126 X |
| 3,269,691 | 8/1966 | Meima | 251/174 X |
| 3,891,183 | 6/1975 | Feiring | 251/174 X |
| 4,319,734 | 3/1982 | Acar | 251/174 |

FOREIGN PATENT DOCUMENTS

| 139391 | 3/1953 | Sweden | 251/174 |
| 607569 | 9/1948 | United Kingdom | 277/129 |

Primary Examiner—Harold W. Weakley
Attorney, Agent, or Firm—Spencer & Frank

[57] ABSTRACT

A valve has an externally threaded valve seat sleeve being axially slidably received in a cavity of the valve housing. The sleeve has an end face forming a seat for a valve head and is surrounded by a seal assembly which has a sealing ring being in circumferential engagement with the valve seat sleeve and a part of the housing walls; an abutment mounted on the valve seat sleeve for abutting the sealing ring to prevent an axial displacement thereof in one direction relative to the valve seat sleeve; and an internally threaded sleeve surrounding and threadedly engaging the valve seat sleeve. The internally threaded sleeve has an annular part cooperating with the sealing ring. There is further provided a force transmitting arrangement for applying a torque to the internally threaded sleeve in response to a force applied externally of the valve for rotating the internally threaded sleeve with respect to the valve seat sleeve to axially press the internally threaded sleeve against the sealing ring.

2 Claims, 3 Drawing Figures

VALVE SEAL ASSEMBLY

BACKGROUND OF THE INVENTION

This invention relates to a valve seal assembly, particularly for a ball valve which has a spherical rotatable valve head engaged by two axially displaceable valve seat sleeves on diametrically opposite sides of the valve head. Those end faces of the sleeves which are oriented towards the valve head form annular seating faces each carrying a sealing ring for engagement with the curved valve head surface. Further, each sleeve, at a location spaced from the valve head, is closely surrounded by a sealing ring cooperating with a housing wall. This sealing ring—which is preferably made of heat resistant material—is exposed to an axial pressing force and abuts, with an end face, a metal (steel) ring mounted on the sleeve.

A valve of the above-outlined type is disclosed, for example, in German Offenlegungsschrift (application published without examination) No. 2,457,230. The sealing ring surrounding the valve seat sleeve is made, for example, of asbestos. One of the radial faces of the sealing ring abuts the bead of the seat sleeve and the other radial face abuts a metal ring which surrounds loosely the valve seat sleeve and is pressed axially by an annular spring against the sealing ring associated with the valve head.

It is a disadvantage of the above-outlined known construction that no separate pressing force can be applied to the sealing ring surrounding the valve seat sleeve for sealing the space between the sleeve and a cylindrical housing wall surrounding the sleeve. This sealing assembly is designed to be exposed only to the pressure which is simultaneously applied to the seal between the valve head and the valve seat sleeve. Such a sealing pressure cannot be varied from the outside. Further, the known valve construction is not adapted for removal of the valve head without disassembly of the valve housing from the pipeline in which it is installed. For such a removal it would be necessary to shift the valve seat sleeves outwardly to an extent sufficient to clear the path to permit pulling of the valve head upwardly, at least in the open position of the valve.

U.S. Pat. No. 3,653,631 discloses a valve construction which includes a worm gear drive by means of which an axial pressure can be exerted on the seals at the end faces of the valve seat sleeve. For this purpose, the worm gear is designed as a threaded ring which surrounds and threadedly engages the valve seat sleeve. Upon rotation of the worm, whose shaft projects from the housing, the valve seat sleeve is axially displaced, while the threaded ring driven by the worm is prevented from shifting axially. Such a worm gear arrangement, however, is incapable of exerting a pressure on a sealing ring mounted about the valve seat sleeve. Further, the known worm gear arrangement cannot be used in valves having upwardly removable valve balls, Thus, the presence of a conventional worm gear arrangement requires a disassembly of the entire valve housing from the pipe if the valve head is to be removed from the valve.

SUMMARY OF THE INVENTION

It is an object of the invention to provide an improved valve construction from which the above-outlined disadvantages of prior art arrangements are eliminated.

This object and others to become apparent as the specification progresses, are accomplished by the invention, according to which, briefly stated, the valve has an externally threaded valve seat sleeve being axially slidably received in a cavity of the valve housing. The sleeve has an end face forming a seat for a valve head and is surrounded by a seal assembly which has a sealing ring being in circumferential engagement with the valve seat sleeve and a part of the housing walls; an abutment mounted on the valve seat sleeve for abutting the sealing ring to prevent an axial displacement thereof in one direction relative to the valve seat sleeve; and an internally threaded sleeve surrounding and threadedly engaging the valve seat sleeve. The internally threaded sleeve has an annular part cooperating with the sealing ring. There is further provided a force transmitting arrangement for applying a torque to the internally threaded sleeve in response to a force applied externally of the valve for rotating the internally threaded sleeve with respect to the valve seat sleeve to axially press the internally threaded sleeve against the sealing ring.

DESCRIPTION OF THE PREFERRED EMBODIMENT

Figure 1:
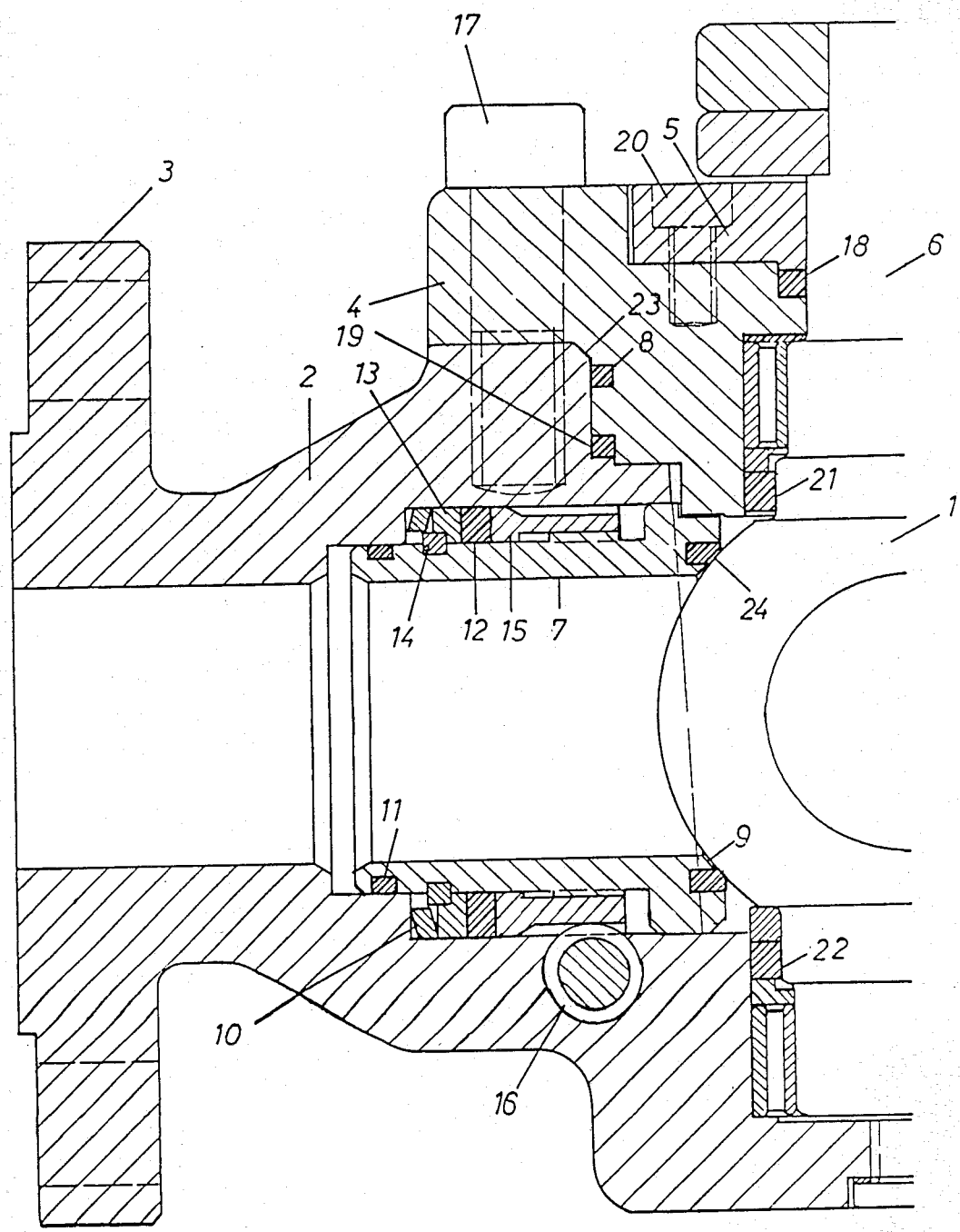
FIG. 1 is an axial sectional view of a preferred embodiment of the invention.

Turning now to the FIG. 1, there is shown in axial section one half of a symmetric valve construction according to the invention. The valve has a valve housing 2 defining a cavity in which there is received a spherical valve head (valve ball) 1. The valve is mounted in line in a pipe (not shown) by means of oppositely located housing flanges 3 (only one shown). The housing 2 is covered at the top by a closure plug 4 which includes a sealing bushing 5 for the shaft 6 of the valve head 1. The Figure illustrates the valve head 1 in its closed position.

The valve includes elastic seals 11, 21 and 22 made of a material designed to resist normal operational temperatures and further has seals 12, 18 and 19 which are of a material that is resistant to high temperatures. The seals 11, 21 and 22 have the advantage that due to their elasticity they provide a tight seal even if only small sealing pressures are applied. If, however, these seals are damaged or destroyed because of high temperatures of, for example, 650° C., the high-temperature resistant seals 12, 18 and 19 at least ensure that no substantial quantities of fluid can escape from the pipeline.

In a cylindrical portion of the valve housing cavity there are provided, on diametrically opposite sides of the valve ball 1, two valve seat sleeves 7 (only one shown). Each valve seat sleeve 7 carries, at its end oriented towards the valve head 1, an elastic sealing ring 24 which may be of relatively hard material and which is pressed against the valve head 1. Preferably, the end face (seating face) of the valve seat sleeve 7 conforms to the curvature of the valve heat 1 so that even if the sealing ring 24 is destroyed, a certain sealing effect remains by virtue of the contacting, conforming spherical surfaces. The force with which the sealing ring 24 is pressed against the valve head 1 is supplied in a known manner by a spring washer 10 exerting an axial force on the valve seat sleeve 7 in a manner to be described later. Adjacent its end remote from the valve head 1, the valve seat sleeve 7 carries a sealing ring 11 which is made of an elastic material and which engages the cylindrical wall surface of the valve housing 2.

Figure 2:
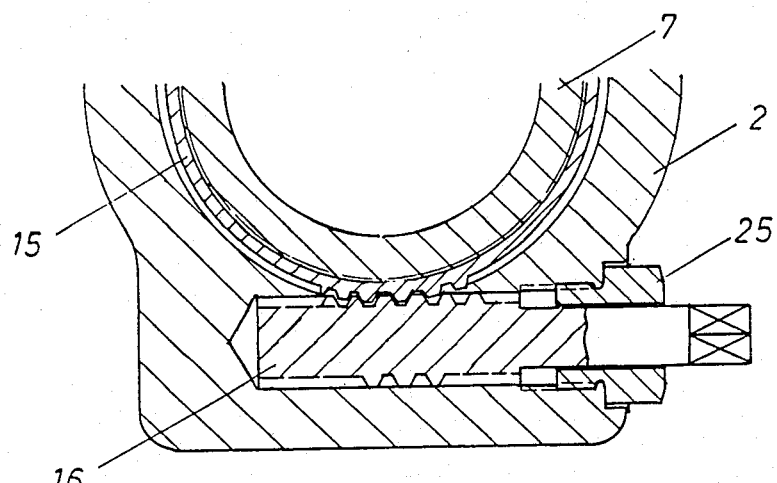
FIG. 2 is a radial sectional view of the preferred embodiment.
Figure 3:
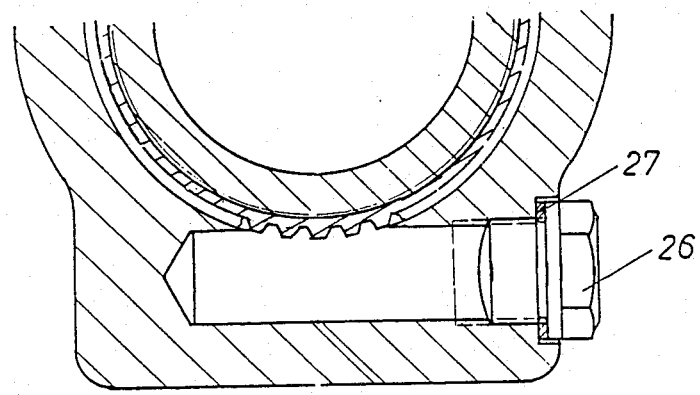
FIG. 3 is a view similar to FIG. 2, with one component removed.

A further sealing ring 12 made of a high-temperature resistant material closely surrounds the valve seat sleeve 7. The radial face of the sealing ring 12 which is oriented away from the valve head 1 abuts a steel ring 13 which is prevented from axial displacement in a direction away from the valve head 1 by means of a snap ring 14 held in a circumferential groove of the valve seat sleeve 7. The radial face of the sealing ring 12 which is oriented towards the valve head 1 is in engagement with a radial face of an internally threaded sleeve 15 which surrounds and threadedly engages the externally threaded valve seat sleeve 7. The threaded sleeve 15 may be pressed axially against the sealing ring 12 by rotating the sleeve 15 on and with respect to the valve seat sleeve 7. Such a rotation is effected by means of a worm screw 16 which meshes with external gear teeth provided circumferentially on the sleeve 15. The shaft (not shown) of the worm screw 16 projects from the housing 2 such that the worm gear assembly 15, 16 may be operated from the outside. The worm gear configuration on the threaded sleeve 15 is designed in such a manner that an axial displacement of the sleeve 15 together with an axial displacement of the valve seat sleeve 7 may occur when the worm screw 16 is stationary. Thus, a pressing of the seating portion of the valve seat sleeve 7 against the valve head 1 by means of the spring 10 with the intermediary of the components 13, 12 and 15 is not affected by the worm gear assembly 15, 16 which controls the pressing force on the sealing ring 12. Further, a displacement of the valve seat sleeve 7 in a direction away from the valve head 1 which occurs when the valve head 1 is removed after loosening the closure plug screws 17, is not impeded. Expediently, the worm screw 16 is removably supported in the housing 2 so that it can be utilized for other valves as well. In this connection reference is made to to FIGS. 2 and 3. FIG. 2 shows the worm screw 16 inserted in the housing 2, ready to be rotated by an external torque to impart the desired rotation to the threaded sleeve 15. An outward axial displacement of the worm screw 16 is prevented by the radial face of a nut 28 threadedly received in the worm screw bore provided in the housing 2. After the threaded sleeve 15 has been rotated to the desired extent, the nut 28 and the worm screw 16 are axially removed and replaced by a screw 26 having a seal 27, as shown in FIG. 3. In addition to the sealing ring 12, sealing rings 18 and 19 are provided which are made of high-temperature resistant material and which are carried by the closure plug 4 and engage, respectively, the shaft 6 of the valve head 1 and wall surfaces of the valve housing 2. The required pressing force for these sealing rings 18 and 19 is generated during assembly by tightening the screws 20 of the bushing 5 and the screws 17 of the closure plug 4.

The sealing rings 21 and 22 adjoining the pin bearings 25 on diametrically opposite sides of the valve head 1 are made of an elastic material.

The annular surface 23 of the closure plug 4 is expediently adapted to the corresponding annular surface of the housing 2 in such a manner that upon tightening the bolts 17, the pressing force applied to these annular surfaces contributes to the sealing effect of the valve seals.

It will be understood that the above description of the present invention is susceptible to various modifications, changes and adaptations, and the same are intended to be comprehended within the meaning and range of equivalents of the appended claims.

What is claimed is:

1. A valve comprising
(a) a valve housing having inner walls forming a cavity defining a passage for a fluid controlled by the valve;
(b) a movable spherical valve head supported in said cavity for controlling the flow of fluid through the passage;
(c) two valve seat sleeves having an axis and an external thread; said valve seat sleeves being axially slidably received in said cavity on diametrically opposite sides of said valve head; each said valve seat sleeve having an end face forming a seat for said valve head;
(d) a first sealing ring provided on said end face of each said valve seat sleeve; each said first sealing ring contacting said valve head;
(e) a separate force exerting means for axially urging each said valve seat sleeve toward said valve head;
(f) a separate seal assembly surrounding each said valve seat sleeve and including
(1) a second sealing ring being in circumferential engagement with said valve seat sleeve and a part of said inner walls of said valve housing; said second sealing ring having opposite, generally radial faces;
(2) a metal abutment ring surrounding said valve seat sleeve for abutting one of said radial faces to prevent an axial displacement of said second sealing ring in one direction relative to said valve seat sleeve;
(3) an internally threaded sleeve surrounding said valve seat sleeve and being in a threaded engagement therewith; said internally threaded sleeve having an annular part cooperating with the other radial face of said sealing ring; and
(g) separate force transmitting means for applying a torque to each said internally threaded sleeve in response to a force applied externally of the valve for rotating said internally threaded sleeve with respect to the valve seat sleeve to axially press said annular part of said internally threaded sleeve against said second sealing ring, whereby said second sealing ring is axially pressed between said abutment ring and said internally threaded sleeve; each said force transmitting means including a worm gear extending circumferentially about each internally threaded sleeve and being in a torque-transmitting relationship therewith, and a worm screw supported in said valve housing and meshing with said worm gear.

2. A valve as defined in claim 1, further comprising means for removably supporting said worm screw in said valve housing.

* * * * *